US010552339B2

(12) United States Patent
Basu et al.

(10) Patent No.: US 10,552,339 B2
(45) Date of Patent: Feb. 4, 2020

(54) DYNAMICALLY ADAPTING MECHANISM FOR TRANSLATION LOOKASIDE BUFFER SHOOTDOWNS

(71) Applicant: ADVANCED MICRO DEVICES, INC., Santa Clara, CA (US)

(72) Inventors: Arkaprava Basu, Austin, TX (US); Joseph L. Greathouse, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/005,882

(22) Filed: Jun. 12, 2018

(65) Prior Publication Data

US 2019/0377688 A1 Dec. 12, 2019

(51) Int. Cl.
*G06F 12/10* (2016.01)
*G06F 12/1027* (2016.01)
*G06F 9/48* (2006.01)

(52) U.S. Cl.
CPC ........ *G06F 12/1027* (2013.01); *G06F 9/4812* (2013.01); *G06F 2212/682* (2013.01); *G06F 2212/683* (2013.01)

(58) Field of Classification Search
None
See application file for complete search history.

(56) References Cited

U.S. PATENT DOCUMENTS

| 2006/0259732 | A1* | 11/2006 | Traut | G06F 12/1036 711/173 |
| 2008/0140897 | A1* | 6/2008 | Ganguly | G06F 12/1027 710/268 |
| 2014/0075151 | A1* | 3/2014 | Cain, III | G06F 12/1027 711/207 |
| 2014/0115297 | A1* | 4/2014 | Cain, III | G06F 12/1027 711/207 |
| 2015/0100753 | A1* | 4/2015 | Shen | G06F 12/1027 711/207 |
| 2016/0371196 | A1* | 12/2016 | Koh | G06F 12/1009 |
| 2017/0337256 | A1* | 11/2017 | Iliopoulos | G06F 12/1027 |

OTHER PUBLICATIONS

Amit, Nadav, "Optimizing the TLB Shootdown Algorithm with Page Access Tracking", Proceedings of the 2017 USENIX Annual Technical Conference, Jul. 12-14, 2017, Santa Clara, CA, 15 pages.

* cited by examiner

*Primary Examiner* — Kevin Verbrugge (57) ABSTRACT

An operating system (OS) of a processing system having a plurality of processor cores determines a cost associated with different mechanisms for performing a translation lookaside buffer (TLB) shootdown in response to, for example, a virtual address being remapped to a new physical address, and selects a TLB shootdown mechanism to purge outdated or invalid address translations from the TLB based on the determined cost. In some embodiments, the OS selects an inter-processor interrupt (IPI) as the TLB shootdown mechanism if the cost associated with sending an IPI is less than a threshold cost. In some embodiments, the OS compares the cost of using an IPI as the TLB shootdown mechanism versus the cost of sending a hardware broadcast to all processor cores of the processing system as the shootdown mechanism and selects the shootdown mechanism having the lower cost.

20 Claims, 4 Drawing Sheets

DYNAMICALLY ADAPTING MECHANISM FOR TRANSLATION LOOKASIDE BUFFER SHOOTDOWNS

This invention was made with government support under the PathForward Project with Lawrence Livermore National Security (Prime Contract No. DE-AC52-07NA27344, Subcontract No. B620717) awarded by Department of Energy (DOE). The Government has certain rights in this invention.

BACKGROUND

Many processing systems use virtual memory for handling data accesses by executing programs (e.g., applications, operating systems, device drivers, etc.). In such a processing system, programs access memory using "virtual addresses" in "virtual address spaces," which are local address spaces that are specific to corresponding programs, instead of accessing memory using addresses based on the physical locations (or "physical addresses") of blocks of memory (or "pages"). Thus, to support memory accesses, the processing system typically employs address translation circuitry to translate the virtual addresses to corresponding physical addresses. The address translation circuitry employs one or more translation lookaside buffers (TLBs) to cache virtual-to-physical address translations for efficient lookup by processor cores. To maintain coherency, whenever virtual addresses are remapped to a new physical address, or permission bits are changed, etc., an operating system must perform a TLB shootdown to purge outdated or invalid translations. TLB shootdown latency can significantly affect application performance in large multicore systems.

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

FIGS. 1-4 illustrate techniques for dynamically selecting a TLB shootdown mechanism based on the relative costs associated different available mechanisms. In some embodiments, the available mechanisms include performing a TLB shootdown using an inter-processor interrupt (IPI) to a subset of processor cores of the processing system and using a broadcast signal to all processor cores of the processing system, in response to an indication that a processor core is restricting access to one or more pages of shared memory. An operating system (OS) of the processing system determines a cost associated with each mechanism for performing the TLB shootdown and selects a TLB shootdown mechanism based on the determined cost. In some embodiments, the OS selects an IPI as the TLB shootdown mechanism if the cost associated with sending an IPI is less than a threshold cost. In some embodiments, the OS compares the cost of using an IPI as the TLB shootdown mechanism versus the cost of sending a hardware broadcast to all processor cores of the processing system as the shootdown mechanism and selects the shootdown mechanism having the lower cost.

The OS implements a heuristic for determining the cost associated with a TLB shootdown mechanism based on a variety of factors such as, for example, the number of processor cores having a TLB that includes one or more entries corresponding to the one or more pages for which access is restricted versus the total number of processor cores of the processing system; the topology of the shared memory and processing system; the number of processor cores that are awake; the number of pages for which access is restricted; and the amount of time estimated to complete the TLB shootdown using each of the TLB shootdown mechanisms.

Processor cores in the processing system keep track of the physical locations of the pages for the programs so that programs are not required to keep track of the physical locations of pages in memory. Programs access memory using virtual addresses in virtual address spaces, which are local address spaces that are specific to corresponding programs, instead of accessing memory using addresses based on the physical addresses of pages. As part of managing the physical locations of pages, the processors translate the virtual addresses used by the programs in memory access requests into the physical addresses where the data is actually located. The processors then use the physical addresses to perform the memory accesses for the programs.

In order to enable the virtual address to physical address translation, the computing device includes a page table, which is a record stored in a memory of the computing device that includes an entry, or a "page table entry," with virtual address to physical address translation information for pages of data that are stored in the main memory. Upon receiving a request from a program to access memory at a given virtual address, a processor acquires corresponding physical address information from the page table by performing a page table walk, during which the page table is searched, possibly entry-by-entry, for a page table entry that provides the physical address associated with the virtual address.

Because the above-described page table walks are relatively slow, the processing system includes TLBs, which are local caches in each processor that are used by the processor core for storing a limited number of copies of page table entries acquired during page table walks (or information based on page table entries). During operation, processor cores first attempt to acquire cached page table entries from the corresponding TLB for performing virtual address to physical address translations. When the copy of the corresponding page table entry is not present in the TLB (i.e., when a "miss" occurs), the processor cores perform a page table walk to acquire the desired page table entry—and cache a copy of the acquired page table entry in the TLB.

During operation, processor cores in the processing system may modify page table entries in the page table (e.g., change virtual address to physical address translation information for the page table entries, change a read/write property for page table entries, etc.). In order to avoid inconsistencies between the page table and copies of page table entries held in TLBs in other processors in the computing device, a processor core that initiated the modification of the page table entry (or an "initiating processor") performs an operation called a "TLB shootdown." Generally, during a TLB shootdown, a processor core that is to modify a page table entry causes other processor cores that may hold a cached copy of the page table entry to invalidate the cached copy, thereby avoiding the inconsistencies.

When performing a TLB shootdown to enable modifying a page table entry, the initiating processor core (e.g., a memory management unit in the initiating processor core, an operating system executing on the initiating processor core, etc.) modifies the page table entry. If an IPI is used to perform the TLB shootdown, the initiating processor core determines other processor cores that may have copies of the information from the page table entry cached in their TLBs, and sends the other processor cores an IPI that indicates the page table entry being modified. Upon receiving the IPI, each of the other processor cores invalidates an entry in the corresponding TLB containing the page table entry, if such an entry exists in the corresponding TLB. Each other processor core also returns, to the initiating processor core, an acknowledgement. The initiating processor core collects the acknowledgements and, when an acknowledgement has been received from each of the other processor cores, the initiating processor core proceeds with subsequent operations. During these operations, the processor core may switch between kernel-mode and user-mode.

Because the above-described operations for performing a TLB shootdown are long latency, performing the TLB shootdown using an IPI typically requires a significant amount of time to complete (e.g., tens of thousands of cycles of a clock in the processor core). Compounding this problem, the latency of these operations increases as the number of processor cores in the computing device increases. For example, when central processor cores (CPUs) and graphics processor cores (GPUs) share an address space in a computing device, both the CPUs and the GPUs must participate in TLB shootdowns. Thus, if a large number of processor cores have copies of the information from the page table entry that is being modified cached in their TLBs, sending a TLBi instruction via hardware to all of the processor cores of the processing system will be more efficient than performing a TLB shootdown using an IPI.

This TLBi instruction causes the hardware of the initiating processor core to broadcast a TLB invalidation signal to all other processor cores in the processing system. When the other processor cores receive the TLB invalidation signal, they will micro-interrupt and invalidate the appropriate TLB entries without needing to enter the OS or run kernel code. Thus, using the TLBi instruction to perform the TLB shootdown is in many cases more efficient than sending an IPI and loading a heavyweight kernel IPI handler in certain cases.

However, the TLBi mechanism broadcasts the TLB invalidation signal to every processor core in the system, because the initiating processor hardware does not know which processor cores could have translations of the affected page or pages cached in their TLBs. The OS kernel accesses this information by monitoring access bits in the page tables or by keeping track of which processor cores a process has run on, so an IPI-based shootdown mechanism only sends IPIs to processor cores that could potentially have a cached translation. If there are only a few processor cores that have a cached translation and therefore require a TLB shootdown, a targeted IPI may be more efficient than a broadcast TLBi. Accordingly, the OS kernel employs a heuristic to determine whether it is more efficient to perform the TLB shootdown using an IPI or by broadcasting a TLBi instruction, and selects the more efficient mechanism for performing the TLB shootdown.

Figure 1:
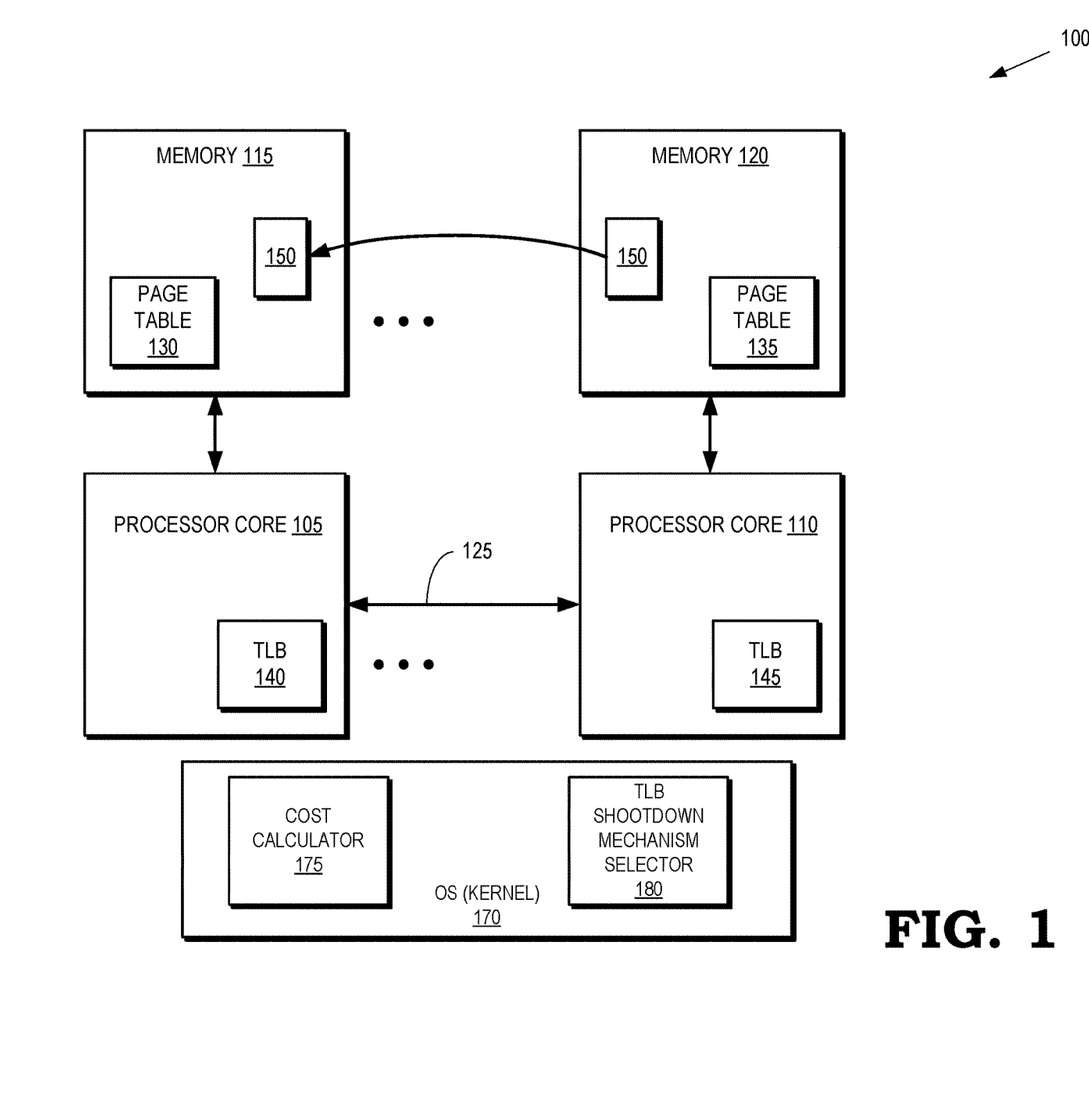
FIG. 1 is a block diagram of a processing system that dynamically selects a TLB shootdown mechanism based on relative costs of a plurality of available TLB shootdown mechanisms according to some embodiments.

FIG. 1 is a block diagram of a processing system 100 according to some embodiments. The processing system 100 includes a plurality of processor cores, including processor cores 105, 110, that execute instructions stored in corresponding memories 115, 120, which store the instructions and data used by the processor cores 105, 110, and results produced by the processor cores 105, 110. The processor cores 105, 110 are implemented as central processor unit cores (CPUs), graphics processor unit cores (GPUs), specialized processor cores or accelerators, application-specific integrated circuits (ASICs), field programmable gate arrays (FPGAs), and the like. Some embodiments of the processor cores 105, 110 are a CPU and an accelerator, respectively. However, in other embodiments, the processor cores 105, 110 represent the processor cores in a multi-socket system or processor cores that are interconnected by scalable networks. The processor cores 105, 110 are generically referred to as "processors."

The memories 115, 120 are implemented as locally attached memories according to non-uniform memory access (NUMA) principles. For example, the processor core 105 accesses the memory 115 directly on the basis of virtual addresses that are mapped to physical addresses in the memory 115. For another example, the processor core 110 accesses the memory 120 directly on the basis of virtual addresses that are mapped to the physical addresses in the memory 120. Some embodiments of the processor cores 105, 110 are able to access information stored in the non-local memories. However, the processor cores 105, 110 are not able to directly access the non-local memories. Instead, the processor cores 105, 110 transmit requests to the other processor core over an interface 125. For example, memory access requests from the processor core 105 to the memory 120 pass through the processor core 110 via the interface 125. For another example, memory access requests from the processor core 110 to the memory 115 pass through the processor core 105 via the interface 125.

Translations of virtual addresses to physical addresses are stored in page tables 130, 135. Each process that is executing in the processing system 100 has a corresponding page table. The page table for a process translates the virtual addresses that are being used by the process to physical addresses in one or more of the memories 115, 120. In some embodiments, the entirety of the page table for a process is stored in one of the memories 115, 120. For example, if a process is executing on the processor core 105, the page table 130 maps virtual addresses used by the process to physical addresses in one or more of the memories 115, 120. In some embodiments, the page table for a process is stored across a plurality of memories 115, 120. For example, if a process is executing on the processor core 105, a portion of the page table content is stored in the page table 130 while the remaining portion of the page table content is stored in the page table 135. Both portions of the page table 130, 135 are used to provide mapping from virtual addresses used by the process to physical addresses in one or more of the memories 115, 120. The page tables 130, 135 are not constrained to map virtual addresses used by a process executing on one of the processor cores 105, 110 to physical addresses in a corresponding one of the memories 115, 120. For example, the page table for a process executing on one of the processor cores 105, 110 may map the virtual address space of the process to physical addresses in both of the memories 115, 120. If multiple processes are executing concurrently on one or more of the processor cores 105, 110, the processing system 100 generates and maintains multiple page tables to map the virtual address spaces of the concurrent processes to physical addresses in one or more of the memories 115, 120.

Translations that are frequently used by the processor cores 105, 110 are stored in translation lookaside buffers (TLBs) 140, 145 that are implemented in the corresponding processor cores 105, 110. The TLBs 140, 145 are used to cache frequently requested virtual-to-physical address translations. Entries including frequently used address translations are written from the page tables 130, 135 into the corresponding TLBs 140, 145. The processor cores 105, 110 are therefore able to retrieve the address translations from the TLBs 140, 145 without the overhead of searching for the translation in the page tables 130, 135. Entries are evicted from the TLBs 140, 145 to make room for new entries according to a TLB replacement policy.

Pages are migrated between the memories 115, 120 or duplicated in the memories 115, 120 by conveying copies of the pages over the interface 125. In the illustrated embodiment, a page 150 is copied from the memory 120 to the memory 115. The page 150 is duplicated if the page 150 remains in the memory 120 after the operation. In some embodiments, a write to the migrated page 150 triggers the invalidation of the page in the destination memory 115, at which point the original copy of the page 150 is removed from memory 120 and its page table entry is updated to refer to the new physical page 150 in the destination memory 115.

In response to migration or duplication of pages, the processor cores 105, 110 insert entries into the corresponding TLBs 140, 145 to map a virtual address of the migrated or duplicated page to a physical address in the destination memory location and modifies a corresponding entry in one or more of the page tables 130, 135. For example, processor core 105 adds an entry to the TLB 140 that maps a virtual address of the page 150 to the physical address of the page 150 in the memory 115 and updates the page table 135. In addition, TLB 145 of processor core 110 may contain a copy of the page table 135 entry that maps the virtual address of the page 150 to the physical address of the page 150 in the memory 120.

In response to a processor core 105, 110 remapping a virtual address to a new physical address, or changing permission bits for a mapped address, an operating system (OS) (in some embodiments, an OS kernel) 170 must purge stale or outdated address translations. A TLB shootdown is used to invalidate stale or outdated address translations in the TLBs 140, 145. As discussed herein, duplicate copies of a page and the corresponding address translations must be invalidated in response to the translation entry for the original page being invalidated. Thus, the TLBs 140, 145 are searched in response to a TLB shootdown using the virtual page address or the original physical page address and not the physical page address of the duplicate or migrated page. Entries in the TLBs 140, 145 include the physical address of the original page and the physical address of the migrated or duplicated page, which supports searching the TLBs 140, 145 using the original physical address in response to a TLB shootdown.

To determine the more efficient mechanism for performing the TLB shootdown, the OS (in some embodiments, the OS kernel) 170 includes a cost calculator 175 and a TLB shootdown mechanism selector 180. In response to receiving an indication from an initiating processor core 105 that the page 150 is invalid due to, for example, a write access, the cost calculator 175 determines a cost of performing a TLB shootdown to a subset of the processor cores having TLBs that include an entry corresponding to the page 150 using an IPI. If the cost is above a threshold, the TLB shootdown mechanism selector 180 signals the processor core 105 to broadcast a TLBi instruction to all of the processor cores of the processing system 100. On the other hand, if the cost calculator 175 determines that the cost of performing the TLB shootdown to the subset of the processor cores having TLBs that include an entry corresponding to the page 150 using an IPI is not above the threshold, the TLB shootdown mechanism selector 180 signals the processor core 105 to send an IPI to the subset of processor cores.

Figure 2:
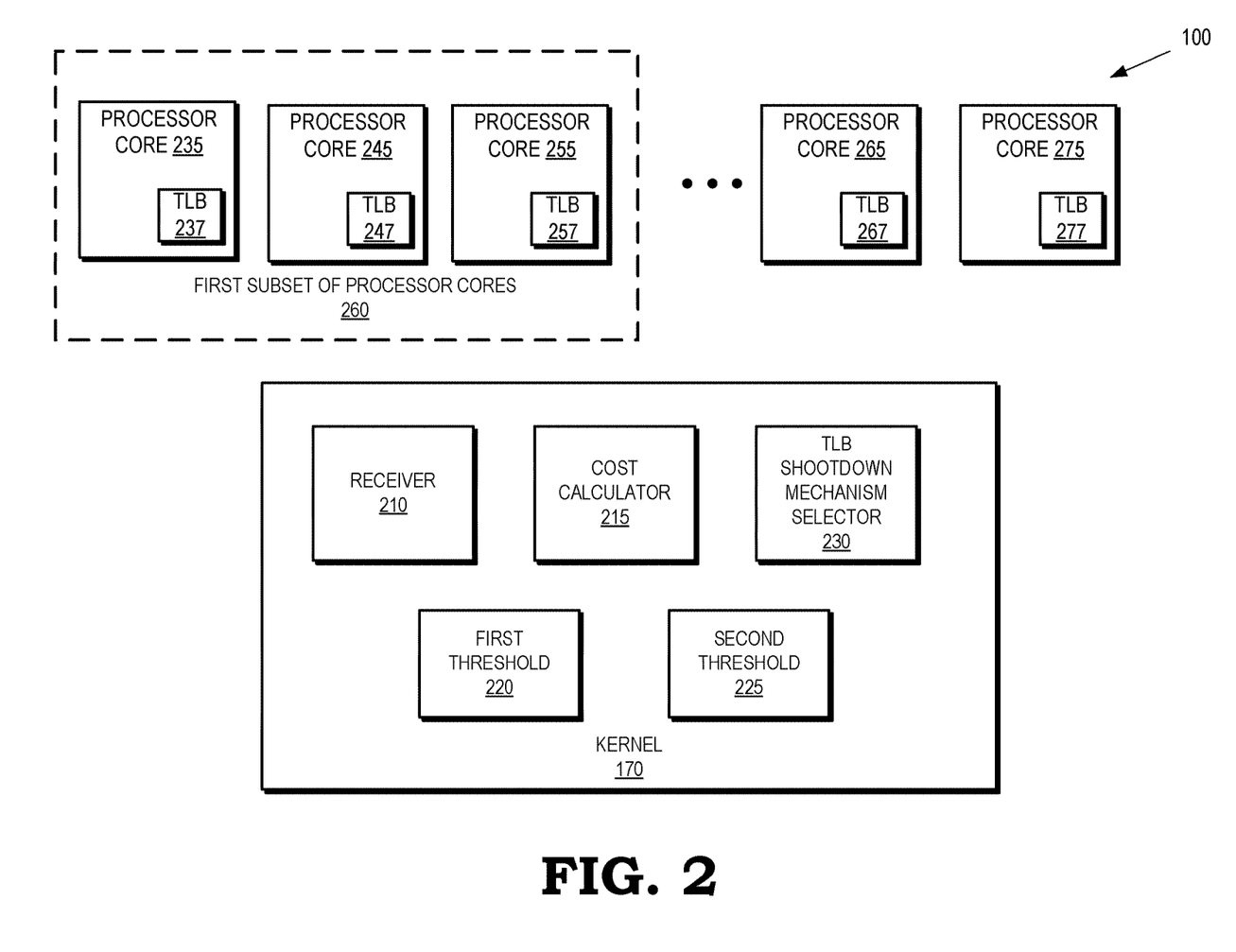
FIG. 2 is a block diagram of a kernel configured to select a TLB shootdown mechanism based on a cost of sending an inter-processor interrupt to a subset of processor cores of the processing system according to some embodiments.

FIG. 2 illustrates the kernel 170 of the processing system 100 of FIG. 1 configured to select a TLB shootdown mechanism based on a cost of sending an inter-processor interrupt to a subset of processor cores of the processing system according to some embodiments. The kernel 170 includes a receiver 210, a cost calculator 215, a first threshold 220, a second threshold 225, and a TLB shootdown mechanism selector 230. In the example depicted in FIG. 2, the processing system 100 includes a plurality of processor cores, including processor cores 235, 245, 255, 265, and 275, each of which includes a TLB 237, 247, 257, 267, and 277, respectively.

The receiver 210 is configured to gather information from each of the plurality of processor cores 235, 245, 255, 265, and 275 to determine whether a processor has a stale entry in its TLB after the data corresponding to the entry has been moved, or after other threads or the OS determines that the permission bits should deny access. In some embodiments, the receiver 210 determines which processors have stale entries in their TLBs based on which processor cores the process invoking the remapped virtual address has been scheduled to run on. Once the receiver 210 receives such information, a thread running on an out-of-date processor core could access incorrect data, data the out-of-date processor core should not have access to, or memory-mapped IO to a device that no longer exists.

In order to prevent any threads or processor cores from using stale translations, the kernel 170 coordinates TLB shootdowns across the processing system 100. In some embodiments, the kernel 170 applies a lock associated with a region of memory. In other embodiments, the kernel 170 removes access permissions from the page containing the data so that any processor cores without cached TLB entries will fault and see that a shootdown is in progress for this page.

The cost calculator 215 is configured to determine a cost associated with performing the TLB shootdown by signaling the initiating processor core to send an IPI to a subset of processor cores of the processing system 100 that have TLB entries including the virtual address whose translation is to be invalidated. In some embodiments, the cost calculator 215 identifies the subset 260 of processor cores of the processing system 100 that have TLB entries including the virtual address whose translation is to be invalidated by monitoring access bits of entries of a page table maintained at the shared memory (not shown). In some embodiments, for a multi-threaded process, if the access bit of an entry has been set, the cost calculator 215 assumes that all processor cores of the processing system are included in the subset 260 and require a TLB shootdown. In some embodiments, the cost calculator 215 identifies the subset 260 of processor cores that have TLB entries including the virtual address whose translation is to be invalidated by determining at which processor cores a process accessing the virtual address has been run or scheduled.

In some embodiments, the cost calculator 215 determines the cost associated with performing a TLB shootdown using an IPI by comparing the number of processor cores in the subset 260 to a first threshold 220. In some embodiments, the first threshold 220 is set based on the number of processor cores in the processing system 100. If the number of processor cores in the subset 260 is less than the first threshold 220, the cost calculator 215 determines that an IPI will be a cost-effective TLB shootdown mechanism. For example, if the processing system 100 is a system-on-a-chip (SoC) that includes 32 processor cores, the first threshold 220 may be set to 8. If the cost calculator 215 identifies the subset 260 as including only two processor cores that have run a process accessing the virtual address whose translation is to be invalidated, the cost calculator 215 determines that the number of processor cores in the subset 260 is less than the first threshold 220, and thus an IPI will be a cost-effective TLB shootdown mechanism.

Rather than using a simple threshold of processor core counts, in some embodiments, the cost calculator 215 further considers the mapping, or topology, of those processor cores. In a NUMA architecture (e.g. multiple sockets), TLBi or IPIs that cross socket boundaries may have different overheads than those that do not; this may change the decision of which one to use depending on if the mapping cores that must receive the shootdown involves cross-socket (or some other topology-based) communication.

In some embodiments, the cost calculator 215 determines the cost associated with performing a TLB shootdown using a TLBi broadcast. In some embodiments, the TLBi broadcast mechanism is optimized to not cause heavyweight software interrupts, not pollute caches and branch predictors, etc. Nonetheless, if a process has only run on two processor cores of a processing system 100 having 32 processor cores, using a TLBi broadcast mechanism to send micro-interrupts to 32 separate cores (or more, if there are multiple sockets) would consume more time and resources than sending an IPI to the two affected processor cores.

In some embodiments, the cost calculator 215 calculates a cost for one or both TLB shootdown mechanisms (i.e., IPI and TLBi) based on how efficient TLBi is compared to IPIs. In some embodiments, the cost calculator 215 calculates a cost for each TLB shootdown mechanism based on how many processor cores are currently awake. For example, if many of the processor cores in the processing system 100 are in sleep state (e.g., CC6 mode, with caches flushed), then the TLBi instruction would not need to wake them up, thus reducing the cumulative overhead of the TLBi shootdown mechanism such that the cost of the TLBi shootdown mechanism may be lower than the cost of the IPI shootdown mechanism. Alternately, if the TLBi shootdown mechanism implementation does wake up cores, the cost calculator 215 may put greater emphasis on using IPIs in order to not needlessly wake up cores too often and raise overall power and energy usage.

In some embodiments, the cost calculator 215 considers the number of pages involved in a series of TLB shootdowns. If a very large number of pages are being updated, the TLBi shootdown mechanism may broadcast a signal to fully flush the target TLBs. If only one page is being updated, the TLBi may include the virtual address of that page as part of the TLBi broadcast. Depending on the number of pages being updated and the locations in memory of the pages, the kernel 170 may batch a series of TLB shootdown requests as part of an IPI rather than sending multiple single-page-targeted IPIs or a single "flush the whole TLB" TLBi broadcast. In some embodiments, the cost calculator 215 includes a second threshold 225 based on a number of pages. In such embodiments, the cost calculator 215 compares the number of pages being updated to the second threshold 225.

In some embodiments, the cost calculator 215 considers an estimate of the amount of time each processor core of the subset 260 of processor cores will require to invalidate the affected entries of their TLBs. In some embodiments, the cost calculator 215 determines a cost associated with sending a TLBi broadcast to only the subset 260 of processor cores (a "targeted TLBi broadcast"). In such embodiments, the cost calculator 215 estimates how long the kernel 170 would take to set a mask to broadcast the TLBi instruction to only the processor cores of the subset 260 and how much time each processor core of the subset 260 of processor cores will require to invalidate the affected entries of their TLBs.

The TLB shootdown mechanism selector 230 is configured to select a TLB shootdown mechanism based on a comparison of the cost estimated by the cost calculator 215 for performing the TLB shootdown using an IPI to the first threshold 220. In some embodiments, the TLB shootdown mechanism selector 230 selects a TLB shootdown mechanism based on a comparison of the cost estimated by the cost calculator 215 for performing the TLB shootdown using an IPI to the cost estimated by the cost calculator 215 for performing the TLB shootdown using a TLBi broadcast. By applying the heuristic of the cost calculator 215, the TLB shootdown mechanism selector 230 dynamically selects a TLB shootdown mechanism for each TLB shootdown that will result in higher efficiency and/or lower latency.

Figure 3:
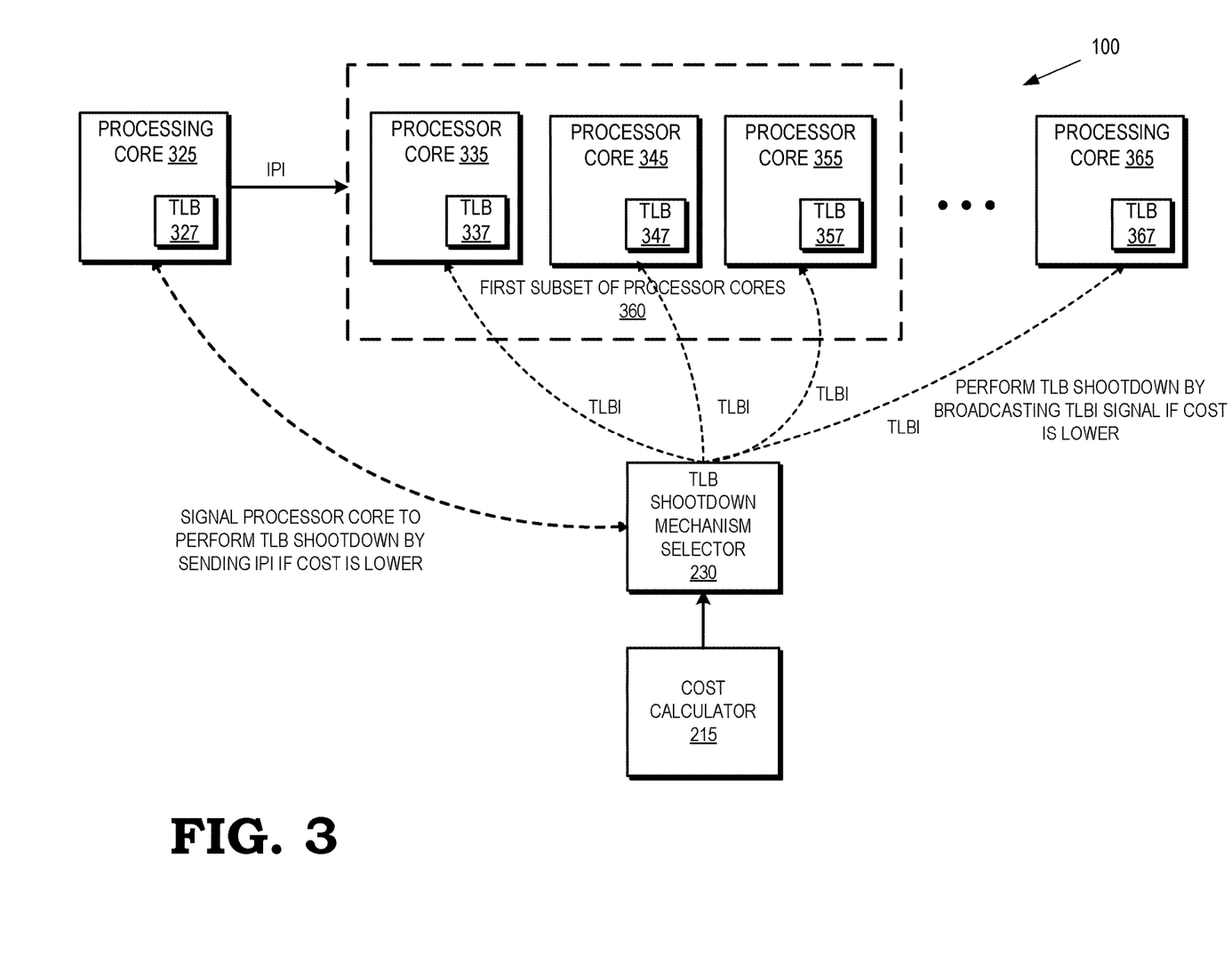
FIG. 3 is a block diagram of a processing system configured to dynamically select a TLB shootdown mechanism according to some embodiments.

FIG. 3 illustrates the processing system 100 dynamically selecting a TLB shootdown mechanism according to some embodiments. Processing core 325 initiates the modification of a page table entry, triggering a TLB shootdown. The cost calculator 215 determines the cost of performing the TLB shootdown by sending an IPI to the subset of processor cores 360 having TLBs with virtual addresses corresponding to the page table entry and the cost of performing the TLB shootdown by broadcasting a TLBi instruction signal to all of the processing cores of the processing system 100. In the example of FIG. 3, processor cores 335, 345, and 355 include TLBs 337, 347, and 357, respectively, that each contain the virtual address corresponding to the page table entry, and are therefore included in the first subset of processor cores 360.

If the cost calculator 215 determines that the cost associated with performing the TLB shootdown by sending an IPI to the first subset of processor cores 360 is lower than the cost associated with performing the TLB shootdown by broadcasting a TLBi signal to all of the processor cores of the processing system 100, the TLB shootdown mechanism selector 230 signals the initiating processor core 325 to send an IPI to the first subset of processor cores 360. On the other hand, if the cost calculator 215 determines that the cost associated with performing the TLB shootdown by broadcasting a TLBi signal to all of the processor cores of the processing system 100 is lower than the cost associated with performing the TLB shootdown by sending an IPI to the first subset of processor cores 360, the TLB shootdown mechanism selector 230 broadcasts the TLBi signal to all of the processor cores of the processing system 100.

Figure 4:
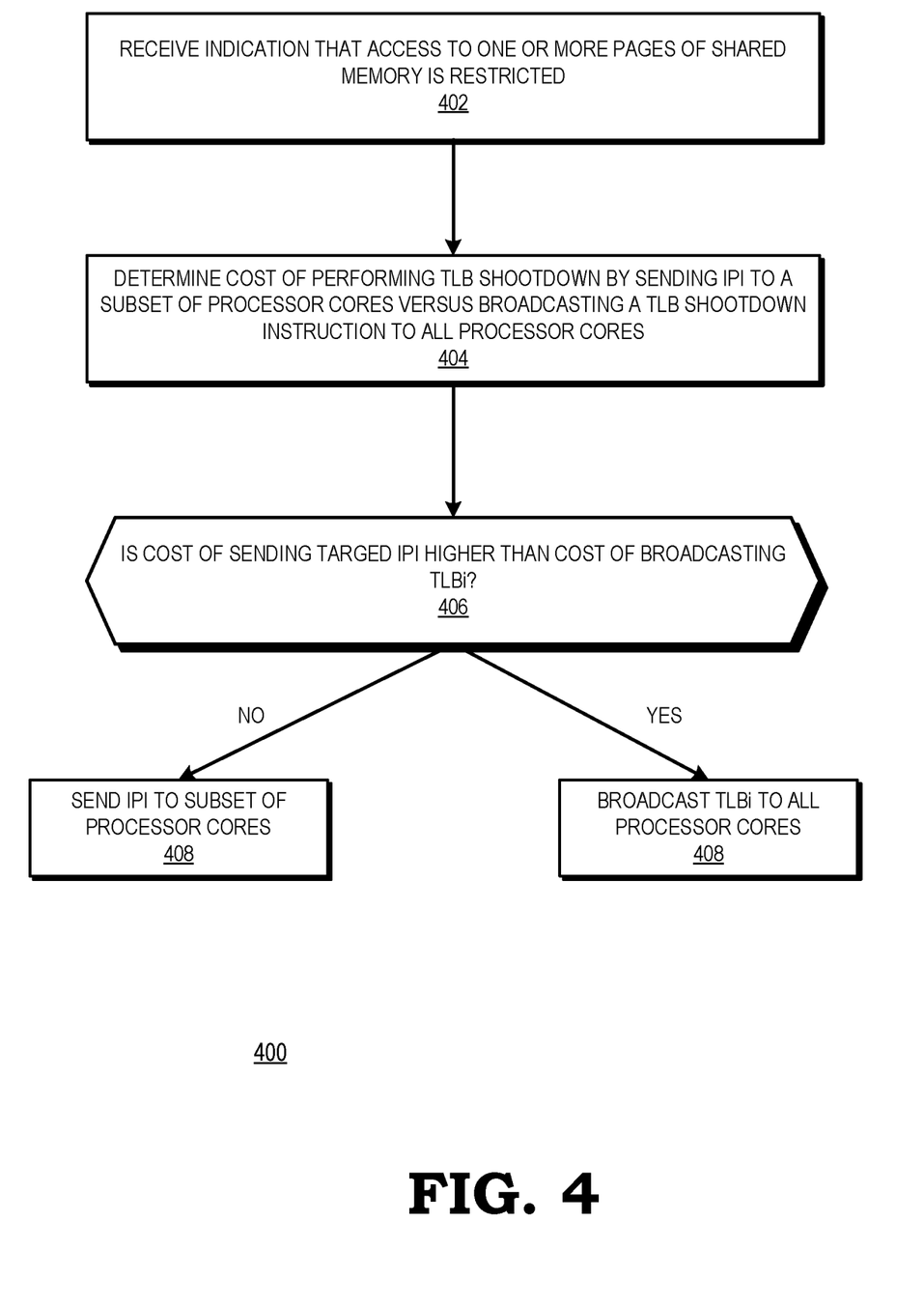
FIG. 4 is a flow diagram of a method of dynamically selecting a TLB shootdown mechanism according to some embodiments.

FIG. 4 is a flow diagram of a method 400 of dynamically selecting a TLB shootdown mechanism according to some embodiments. At block 402, the receiver 210 receives an indication from a processor core that access to one or more pages of shared memory is restricted. At block 404, the cost calculator 215 determines a cost associated with performing a TLB shootdown by sending an IPI to a subset of processor cores having TLBs with the virtual address(es) of the one or more pages versus broadcasting a TLBi shootdown instruction to all of the processor cores of the processing system 100. At block 406, the TLB shootdown mechanism selector 230 determines whether the cost of sending a targeted IPI to the subset of processor cores is higher than the cost of broadcasting a TLBi shootdown instruction to all of the processor cores.

At block 408, if the TLB shootdown mechanism selector 230 determines that the cost of sending a targeted IPI to the subset of processor cores is not higher than the cost of broadcasting a TLBi shootdown instruction to all of the processor cores, the TLB shootdown mechanism selector 230 signals the initiating processor core to send an IPI to the subset of processor cores that include TLBs with the virtual address(es) of the one or more pages. At block 410, if the TLB shootdown mechanism selector 230 determines that the cost of sending a targeted IPI to the subset of processor cores is higher than the cost of broadcasting a TLBi shootdown instruction to all of the processor cores, the TLB shootdown mechanism selector 230 broadcasts the TLBi shootdown instruction to all of the processor cores.

In some embodiments, the apparatus and techniques described above are implemented in a system including one or more integrated circuit (IC) devices (also referred to as integrated circuit packages or microchips), such as the processing system 100 described above with reference to FIGS. 1-4. Electronic design automation (EDA) and computer aided design (CAD) software tools may be used in the design and fabrication of these IC devices. These design tools typically are represented as one or more software programs. The one or more software programs include code executable by a computer system to manipulate the computer system to operate on code representative of circuitry of one or more IC devices so as to perform at least a portion of a process to design or adapt a manufacturing system to fabricate the circuitry. This code includes instructions, data, or a combination of instructions and data. The software instructions representing a design tool or fabrication tool typically are stored in a computer readable storage medium accessible to the computing system. Likewise, the code representative of one or more phases of the design or fabrication of an IC device may be stored in and accessed from the same computer readable storage medium or a different computer readable storage medium.

A computer readable storage medium may include any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. The computer readable storage medium may be embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above may implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method comprising:
    receiving, at an operating system, an indication that a first processor core of a computing system comprising a plurality of processor cores is restricting access to one or more pages of a shared memory of the plurality of processor cores and that entries of translation lookaside buffers (TLBs) corresponding to the one or more pages are to be invalidated;
    determining, at the operating system, a first cost for invalidating entries of TLBs corresponding to the one or more pages associated with sending an inter-processor interrupt to a first subset of the processor cores of the computing system, the first subset comprising processor cores comprising a TLB that includes one or more entries corresponding to the one or more pages;
invalidating one or more TLB entries corresponding to the one or more pages by sending an inter-processor interrupt to the processor cores comprising the first subset in response to determining that the first cost is below a threshold; and
invalidating one or more TLB entries corresponding to the one or more pages by broadcasting a TLB invalidation signal to the plurality of processor cores of the computing system in response to determining that the first cost exceeds the threshold.

2. The method of claim 1, wherein the first cost is based on a number of processor cores comprising the first subset and a number of processor cores comprising the plurality of processor cores.

3. The method of claim 1, wherein the first cost is based on an estimate of an amount of time each processor core of the first subset will take to invalidate the entries.

4. The method of claim 1, further comprising:
determining a second cost associated with broadcasting the TLB invalidation signal; and
invalidating one or more TLB entries corresponding to the one or more pages by broadcasting a TLB invalidation signal to the plurality of processor cores of the computing system in response to determining that the first cost exceeds the second cost,
wherein broadcasting the TLB invalidation signal comprises setting a mask to send a hardware broadcast instruction to only the processor cores comprising the first subset and
wherein the second cost is based on an estimate of an amount of time completing a TLB shootdown in response to broadcasting the TLB invalidation signal will take.

5. The method of claim 1, further comprising identifying, at the operating system, the processor cores comprising the first subset based on one of:
monitoring an access bit at an entry of a page table maintained at the shared memory, the entry corresponding to the one or more pages and mapping a virtual memory address to a physical memory address; or
tracking on which processor cores a process using the virtual memory address has been scheduled to run.

6. The method of claim 1, wherein invalidating TLB entries corresponding to the one or more pages by broadcasting the TLB invalidation signal comprises instructing the processor cores to fully flush the TLBs associated with each processor core in response to determining that a number of pages for which access is restricted exceeds a threshold number of pages.

7. A method, comprising:
at an operating system of a processing system comprising a plurality of processor cores, and in response to receiving an indication from a processor core that a mapping of a virtual memory address to a physical memory address is invalid, determining:
a first cost associated with performing a translation lookaside buffer (TLB) shootdown by sending an inter-processor interrupt to a first subset of the processor cores of the processing system, the first subset comprising processor cores having a TLB that includes one or more entries corresponding to the virtual memory address; and
a second cost associated with performing a TLB shootdown by broadcasting a TLB shootdown signal to each of the processor cores; and
performing the TLB shootdown by sending the inter-processor interrupt to the first subset of the processor cores in response to determining that the second cost exceeds the first cost.

8. The method of claim 7, further comprising:
performing the TLB shootdown by broadcasting a TLB shootdown signal to the plurality of processor cores of the processing system in response to determining that the second cost does not exceed the first cost.

9. The method of claim 8, wherein broadcasting the TLB shootdown signal comprises setting a mask to send a hardware broadcast instruction to only the processor cores comprising the first subset and
wherein the second cost is based on an estimate of an amount of time performing the TLB shootdown by broadcasting the TLB shootdown signal will take.

10. The method of claim 7, wherein the first cost is based on a number of processor cores comprising the first subset and a number of processor cores comprising the plurality of processor cores.

11. The method of claim 7, wherein the first cost is based on an estimate of an amount of time each processor core of the first subset will take to invalidate the entries.

12. The method of claim 7, further comprising identifying, at the operating system, the processor cores comprising the first subset based on one of:
monitoring an access bit at an entry of a page table maintained at a memory shared by the processor cores of the processing system, the entry corresponding to a page of the memory comprising an invalid address mapping; or
tracking on which processor cores a process using the virtual memory address has been scheduled to run.

13. The method of claim 7, wherein broadcasting the TLB shootdown signal comprises instructing the processor cores to fully flush the TLBs associated with each processor in response to determining that a number of invalid address mappings exceeds a threshold.

14. The method of claim 7, wherein the first cost is based on a topology of the processing system.

15. The method of claim 7, wherein the first cost is based on how many processor cores are awake.

16. A processing system, comprising
a shared memory;
a plurality of processor cores, each processor core comprising a translation lookaside buffer (TLB) comprising a plurality of entries indicating mappings of virtual memory address to physical memory addresses; and
an operating system comprising:
a receiver configured to receive an indication that a first processor core is restricting access to one or more pages of the shared memory;
a cost calculator configured to determine:
a first cost for invalidating entries of TLBs corresponding to the one or more pages, the first cost associated with sending an inter-processor interrupt to a first subset of the processor cores of the processing system, the first subset comprising processors comprising a TLB that includes one or more entries corresponding to the one or more pages; and a second cost for invalidating entries of TLBs, the second cost associated with broadcasting a TLB invalidation signal to processor cores of the processing system; and a TLB shootdown selector configured to signal the first processor core to send an inter-processor interrupt to the first subset of the processor cores in response to determining that the second cost exceeds the first cost.

17. The processing system of claim 16, wherein the TLB shootdown selector is further configured to broadcast the TLB invalidation signal in response to determining that the second cost does not exceed the first cost.

18. The processing system of claim 16, wherein the first cost is based on a number of processor cores comprising the first subset and a number of processor cores comprising the plurality of processor cores.

19. The processing system of claim 16, wherein the first cost is based on an estimate of an amount of time each processor core of the first subset will take to invalidate the entries.

20. The processing system of claim 16, wherein the first cost is based on a topology of the processing system.

* * * * *